US006922831B1

(12) United States Patent
Kroening et al.

(10) Patent No.: US 6,922,831 B1
(45) Date of Patent: Jul. 26, 2005

(54) METHOD AND SYSTEM FOR PROVIDING SOFTWARE UTILIZING A RESTORE MEDIUM AND A NETWORK

(75) Inventors: James L. Kroening, Dakota Dunes, SD (US); Robert A. Boger, Sioux City, IA (US)

(73) Assignee: Gateway Inc., Irvine, CA (US)

( * ) Notice: Subject to any disclaimer, the term of this patent is extended or adjusted under 35 U.S.C. 154(b) by 449 days.

(21) Appl. No.: 09/631,085

(22) Filed: Aug. 2, 2000

Related U.S. Application Data

(63) Continuation-in-part of application No. 09/562,870, filed on May 1, 2000, now abandoned, which is a continuation of application No. 09/090,118, filed on Jun. 4, 1998, now Pat. No. 6,080,207, application No. 09/631,085, which is a continuation-in-part of application No. 09/093,514, filed on Jun. 8, 1998, now abandoned, application No. 09/631,085, which is a continuation-in-part of application No. PCT/US99/08095, filed on Apr. 13, 1999.

(51) Int. Cl.⁷ ................................................ G06F 9/44
(52) U.S. Cl. ........................ 717/172; 717/174; 717/175
(58) Field of Search ................................ 717/100, 103, 717/168–178; 709/203, 217; 711/162

(56) References Cited

U.S. PATENT DOCUMENTS

| | | | | |
|---|---|---|---|---|
| 5,375,206 A | * | 12/1994 | Hunter et al. | 717/176 |
| 5,504,905 A | * | 4/1996 | Cleary et al. | 713/100 |
| 5,586,304 A | * | 12/1996 | Stupek et al. | 717/170 |
| 5,894,571 A | * | 4/1999 | O'Connor | 713/2 |
| 5,963,743 A | * | 10/1999 | Amberg et al. | 717/174 |
| 5,966,531 A | * | 10/1999 | Skeen et al. | 719/315 |
| 5,991,543 A | * | 11/1999 | Amberg et al. | 717/175 |
| 5,995,757 A | * | 11/1999 | Amberg et al. | 717/175 |
| 6,009,274 A | * | 12/1999 | Fletcher et al. | 717/173 |
| 6,144,992 A | * | 11/2000 | Turpin et al. | 709/208 |
| 6,173,417 B1 | * | 1/2001 | Merrill | 714/15 |

(Continued)

OTHER PUBLICATIONS

Jones et al, "Handling audio and video stream in a distributed environment", ACM SIGOPS, pp 231–243, 1993.*
Johnston et al, "High speed dusributed data handling for on line instrumentaion system", ACM/IEEE Conf. on Super Computing, pp 1–19, Aug. 1997.*
Klampanos et al, "An architecture for information retrieval over semi collaborting peer to peer networks", ACM SAC, pp 1078–1083, Mar. 2004.*
Berger et al, "An adaptive information retrieval system based on associative networks", ACM, APCCM, pp 27–36, 2004.*
"Using your Gateway PC—Restoring Software", Gateway Inc., Jan. 2003.*

*Primary Examiner*—Anil Khatri
(74) *Attorney, Agent, or Firm*—Kevin West; Sutter West PC LLC

(57) ABSTRACT

The present invention is directed to a system and method of restoring an information handling system utilizing a restore medium and a network storage medium. In a first aspect of the present invention, a method of restoring an information handling system utilizing a restore medium to provide software components over a network includes accessing the restore medium by the information handling system and loading a first set of software components capable of supplying data suitable for making the information handling system operational. A connection is initiated with a network storage medium over a network, the connection initiated by a program of instructions included on the removable medium. A second set of software components are received from the network storage medium over the network connection, wherein the second set of software components is suitable for at least one of updating the first set of software components and providing a software component not included on the removable medium.

45 Claims, 7 Drawing Sheets

U.S. PATENT DOCUMENTS

| | | | |
|---|---|---|---|
| 6,179,492 B1 * | 1/2001 | Guy et al. | 717/169 |
| 6,182,275 B1 * | 1/2001 | Beelitz et al. | 717/175 |
| 6,205,527 B1 * | 3/2001 | Goshey et al. | 711/162 |
| 6,457,175 B1 * | 9/2002 | Lerche | 717/173 |
| 6,550,061 B1 * | 4/2003 | Bearden et al. | 717/174 |
| 6,606,740 B1 * | 8/2003 | Lynn et al. | 717/100 |
| 6,771,385 B1 * | 8/2004 | Iizuka et al. | 358/1.15 |
| 6,775,829 B1 * | 8/2004 | Kroening | 717/175 |

* cited by examiner

METHOD AND SYSTEM FOR PROVIDING SOFTWARE UTILIZING A RESTORE MEDIUM AND A NETWORK

CROSS REFERENCE TO RELATED APPLICATION

The present application is a Continuation-In-Part of U.S. patent application Ser. No. 09/562,870 filed May 1, 2000 (now abandoned), which is a Continuation of U.S. patent application Ser. No. 09/090,118 filed Jun. 4, 1998, now U.S. Pat. No. 6,080,207 issued Jun. 27, 2000. The present application is also a Continuation-In Part of U.S. Pat. Application No. 09/093,514 filed Jun. 8, 1998, now abandoned. The present application is also a Continuation-In-Part of International Patent application Number PCT/US99/08095, international filing date Apr. 13, 1999, pending. Said U.S. patent application Ser. No. 09/090,118, Patent Cooperation Treaty application PCT/US99/08095, U.S. patent application Ser. No. 09/093,514, and U.S. patent application Ser. No. 09/562, 870 are herein incorporated by reference in their entirety. The following patent applications are also incorporated by reference in their entirety:

| Ser. No. | Filing Date |
| --- | --- |
| 09/631,641 | Aug. 2, 2000 |
| 09/631,088 | Aug. 2, 2000 |
| 09/631,081 | Aug. 2, 2000 |
| 09/630,404 | Aug. 2, 2000 |

FIELD OF THE INVENTION

The present invention generally relates to the field of information handling systems, and particularly to the provision of software of an information handling system over a network utilizing a restore medium.

BACKGROUND OF THE INVENTION

When information handling systems, such as personal computers and the like, are mass-produced, a manufacturer may take advantage of a common software configuration when loading software onto the hard drives. For example, a computer system is set up as a model system having the desired software configuration that is to be duplicated in other personal computers. Once the model system has been set up, a digital image of the hard drive is created. The digital image is essentially a "picture" of the hard drive. Creating a digital image of the hard drive is well known to those skilled in the art. Once this image is created, it is distributed to the other hard drives requiring the same configuration. The result is that all of the computer systems receiving a copy of the image during their manufacturing and assembly process will have the same hard drive content as the model system.

For software upgrades on existing computer systems, an image is created for a set of changes to be made to the hard drive and the set of changes are then transferred to the computer systems. This results in quicker computer upgrades, which in turn provides a cost savings, particularly when a large number of computer systems are to be upgraded.

Nonetheless, a disadvantage of this approach is that it requires a model system first be set up utilizing the same operating system and the same set of applications as desired on the other computer systems. To set up the model system, the software must be physically loaded from a disk onto the model computer system before the image can be created for transferring to the other computers.

Even if a group of computers are networked together, a baseline configuration must also be established on the file server which requires that the file server physically be set up with the desired software configuration from a disk. The file server then allows the networked computers to have access to the new configuration. Networking prevents a system administrator from having to install software upgrades individually on each computer system. However, the upgrade must first be made to the file server which requires installation via a disk.

Additionally, in the past, information handling systems, such as desk-top computer systems, laptops, personal digital assistants, digital information appliances, and the like, were sold with little or no software. Therefore, the tasks of obtaining, installing and configuring software were left to the purchaser. However, in the ever increasingly competitive environment of the manufacture and sale of information handling systems, manufacturers generally provide hardware and software in a combined system that preferably, is usable out of the box. Further complicating this process is "build to order" computer systems. In build to order information handling systems, the customer may be given a wide selection of software from which to choose. The complexity and sheer number of choices result in essentially a custom configuration, the complexity of which is greatly increased with each choice or option given to the consumer.

One method utilized to address this problem involved extracting a hard drive from the assembly process, connecting the hard drive to a computer for the purpose of programming the drive, programming the drive, disconnecting the drive from the computer and returning the programmed hard drive to the computer assembly process for installation on a computer. However, this method is time consuming and, therefore costly. Furthermore, disconnection and reconnection of the programmed hard drive may corrupt the software programmed onto the drive.

An additional method utilized to address this problem involved loading the hard drive from a network after the computer hardware is assembled. However, this method results in high traffic on the network. In a large-volume manufacturing environment, this high traffic greatly reduces the throughput of the network. In essence, the greater the number of systems to be manufactured, the greater the requirement of network throughput. Furthermore, a network failure may interrupt and even cripple the entire manufacturing line.

Further, when a user purchases a computer-based information handling system from a manufacturer, the computer system typically includes preinstalled devices, device drivers and operating system software such that the computer is ready to operate out-of-the box upon receipt by the user. Ideally, no technical effort is required by the user beyond connecting the cables, plugging the power cable into a power outlet, and turning on the computer. Thus, computer-based information handling systems are readily available to the masses including those having very little or no technical computer background or training.

During the lifetime of the computer system, users may wish to expand the functionality of the computer system by installing additional devices to the computer system that were not preinstalled at the factory by the manufacturer. Often, the additional or "add-on" devices are new products that did not exist as of the manufacture date of the computer system, thus the manufacturer could not design the computer system to fully accommodate these future add-on devices. In order for the add-on devices to work with the computer system and its operating system software, a device driver for the add-on device is also installed such that the computer system may recognize and utilize the add-on device. Further, the user may obtain updated drivers for the factory installed devices as they become available. Thus, eventually, the computer-based information handling system is customized beyond the factory setup by the installation of additional devices and device drivers.

At some point during the lifetime of the computer-based information handling system, it is possible the user may choose to reinstall the operating system software. Typically, the computer system manufacturer provides a system restoration medium such as a diskette or compact disc read-only memory (CD-ROM) that includes the drivers for all the devices that were preinstalled in the computer system when manufactured. The restore diskette or CD-ROM ensures that when the operating system is reinstalled to the hard disk drive, all of the necessary device drivers will be automatically installed, thereby restoring the computer system to the state as provided by the manufacturer. Prior art restoration methods only provide a diskette or CD-ROM that contains an image or "mirror" of the state of the computer system as of the date the system was shipped from the factory. However, in the event the user has customized his or her computer system by installing additional devices after manufacture and before the reinstallation process, the operating system will not have the proper driver available for those add-on devices. As a result, no driver is installed for those devices. Further, any updated drivers for factory installed devices will also not be installed. This is because the restore diskette or CD-ROM only contains information of the state of the computer system as manufactured, but does not include information pertaining to the customization of the computer system with add-on devices or driver updates. Thus, the reinstallation process cannot be automatically completed, and user intervention is required to complete the reinstallation process. Completion of the restoration process by the user at this stage is often complicated and requires a level of technical knowledge and sophistication beyond that possessed by the typical user.

Therefore, it would be desirable to provide an improved method for restoring an information handling system with current software components.

SUMMARY OF THE INVENTION

Accordingly, the present invention is directed to a method of restoring an information handling system utilizing a restore medium. In a first aspect of the present invention, a method of restoring an information handling system utilizing a restore medium to provide software components over a network includes accessing the restore medium by the information handling system and loading a first set of software components capable of supplying data suitable for making the information handling system operational. A connection is initiated with a network storage medium over a network, the connection initiated by a program of instructions included on the removable medium. A second set of software components are received from the network storage medium over the network connection, wherein the second set of software components is suitable for at least one of updating the first set of software components and providing a software component not included on the removable medium.

In a second aspect of the present invention, a system for restoring an information handling system and providing software components over a network includes a restore medium capable of being read by an information handling system, wherein the restore medium includes a first set of software components capable of supplying data suitable for making the information handling system operation and including a program of instruction suitable for initiating a connection with a network storage medium over a network. A network storage medium accessible over the network by an information handling system is also included, wherein the network storage medium includes a second set of software components suitable for at least one of updating the first set of software components and providing a software component not included on the removable medium.

In a third aspect of the present invention, a method of restoring an information handling system suffering a loss of function by utilizing a restore medium suitable for providing software components and receiving updated software components over a network includes accessing the restore medium by the information handling system. A first set of software components are loaded capable of supplying data suitable for restoring the information handling system to operational status. A connection is initiated with a network storage medium over a network, the connection initiated by a program of instructions included on the removable medium and executed by the information handling system. A second set of software components are received from the network storage medium over the network connection, wherein the second set of software components is suitable for at least one of updating the information handling system to a restored state.

In a fourth aspect of the present invention, a restore medium suitable for restoring operation to an information handling system, includes a computer readable medium suitable for being read by an information handling system. The computer readable medium includes a first set of software components capable of supplying data suitable for making the information handling system operation and including a program of instruction suitable for initiating a connection with a network storage medium over a network. A program of instructions is also included for initiating a network connection with a network storage device, wherein the network storage medium includes a second set of software components suitable for at least one of updating the first set of software components and providing a software component not included on the removable medium.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

In the following detailed description of the preferred embodiments, reference is made to the accompanying drawings, which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the scope of the present inventions. The following detailed description is, therefore, not to be taken in a limiting sense.

Referring generally now to FIGS. 1 through 7, exemplary embodiments of the present invention are shown. An information handling system may include a typical computer system, such as a desktop or laptop computer, personal digital assistant, digital information appliance, internet appliance, and the like. A removable medium is a medium readable by an information handling system and which is suitable for storing instructions and data, such as a compact disk read-only-memory (CD-ROM), digital versatile disc (DVD), PC Card for utilization in a PC slot, floppy disk, floppy/optical disk for use in a floppy/optical drive, zip disk for use in a zip drive, tape for use in a tape drive, and the like as contemplated by a person of ordinary skill in the art.

Figure 1:
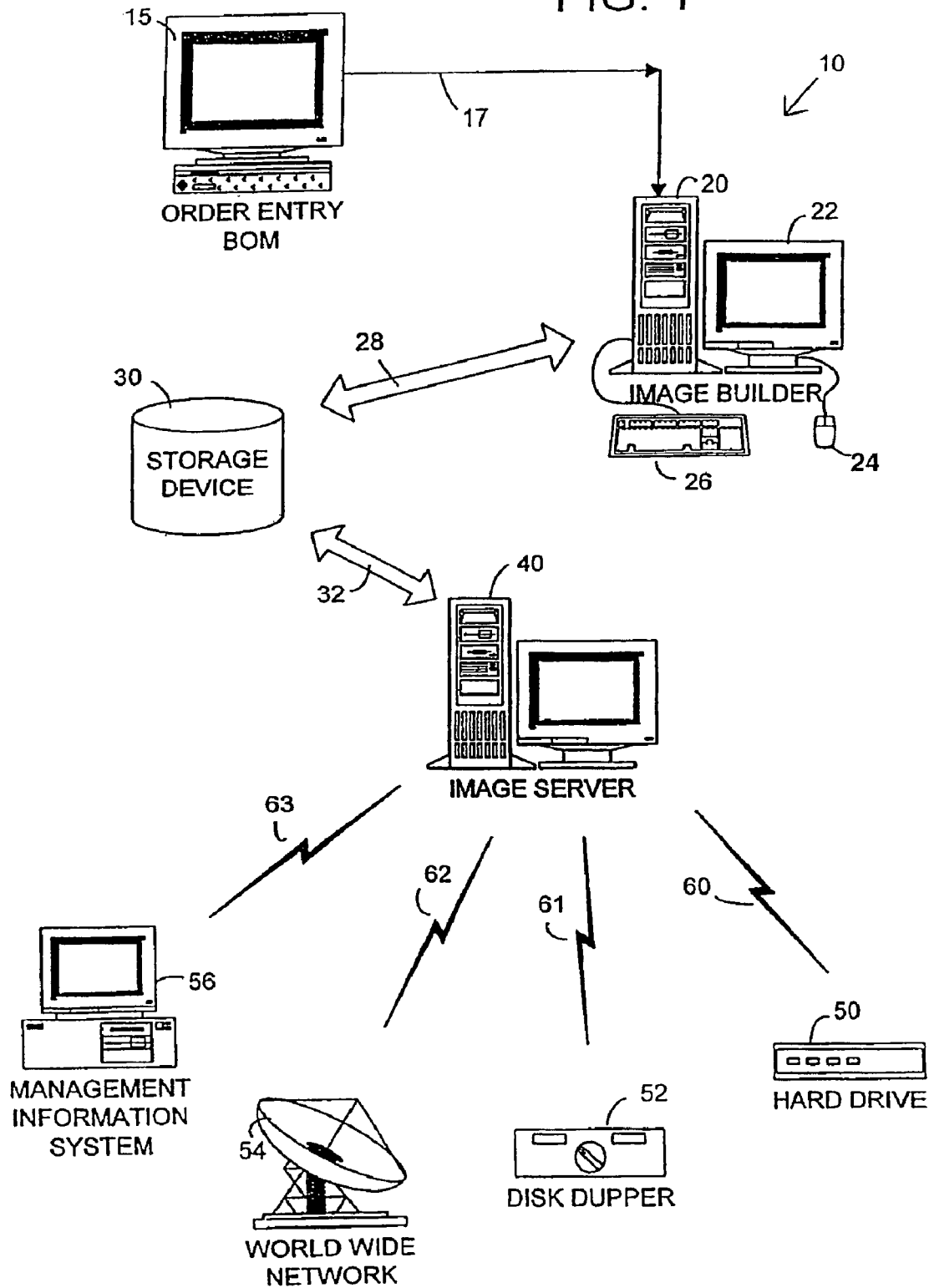
FIG. 1 is an exemplary embodiment of the present invention wherein a disk image is created for a desired configuration.

Referring now to FIG. 1, an exemplary embodiment of the present invention is shown wherein a disk image is created for a desired configuration. The disk image process utilizes a computerized network system 10 for creating and delivering custom software configurations defined by purchasing customers. The disk image process utilizes intelligence and granularity in generating the desired software configuration. Included within the computerized network system 10 is an image builder 20 that creates a disk image of the desired software configuration and then transfers that image to a storage device 30. The storage device 30 is connected to an image server 40 that performs the task of delivering the image. The image may be delivered directly to a hard drive 50 during a manufacturing and assembly process of a computer system. The image may also be delivered to a disk dupper 52 for duplicating the image on a removable medium that is readable by an information handling system, a ground based transmitter 54 for broadcasting the image, or to a management information system (MIS) 56.

The first step in the exemplary disk image delivery process involves entering a customer's order into an order entry system 15 to establish a bill of materials (BOM). The bill of materials includes a customer's selection of a desired software configuration for a particular computing system. Included within the bill of materials are hardware parameters of the computing system to be receiving the software configuration, including BIOS and CMOS settings plus other pertinent information as may be necessary, such as operating systems, drivers, utilities, application software, vendor software, and the like. A software configuration may also include the hardware settings, drivers, user-selected software, and the like as contemplated by a person of ordinary skill in the art. This information may be used by the image builder to create a digital image of the desired software configuration.

In one embodiment, the order entry system 15 is a minicomputer. A mini-computer is a multi-processing system capable of supporting from four to about two hundred users simultaneously. Minicomputers are well known to those skilled in the art. For example, an IBM AS/400 minicomputer functions as the order entry system in one embodiment. In terms of size and power, a minicomputer falls between a workstation and a mainframe. Equivalent inputting methods are acceptable as an alternative to using a minicomputer, such as the use of a workstation, mainframe or other information handling system as contemplated by a person of ordinary skill in the art.

Information included within the bill of materials corresponds to the particular software configuration desired by a customer, plus specifics on the computing system receiving the software configuration. A desired configuration may be an upgrade to an application already installed on the computing system or the configuration may be a new hard drive that is to be configured with an operating system and a variety of applications. Specifics on the computing system include, but are not limited to the following parameters, hard drive size, installed accessories, current software configuration, BIOS and CMOS settings. Information corresponding to the bill of materials as generated by the order entry system is applied to the image builder over interface 17. Interface standards between a minicomputer and an image builder 20 are well known in the art.

Figure 2:
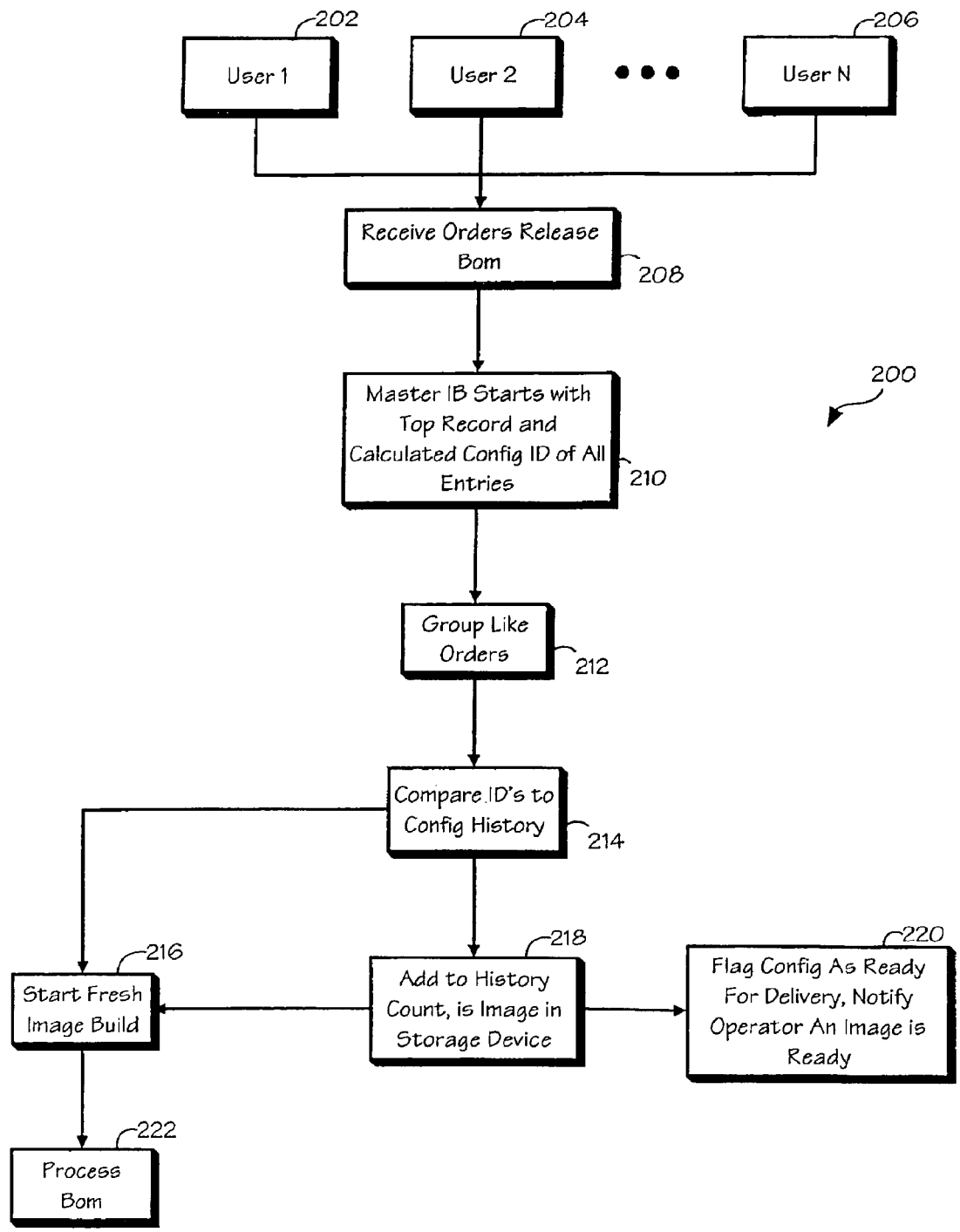
FIG. 2 is a flow diagram of an exemplary embodiment of the present invention wherein a logic flow for creating a disk image of a desired software configuration is shown.

In referring to FIG. 2, an exemplary embodiment 200 is shown wherein a logic flow for creating a disk image of a desired software configuration is illustrated. A plurality of users 202, 204 and 206 enter orders for a first information handling system, a second information handling system and up to an "Nth" information handling system. The first information handling system is different from the second information handling system. For example, the first information handling system may include a different hardware component requiring a different driver, software component, and the like. These orders are received and a Bill of Materials (BOM) is generated 208.

Receipt of the bill of materials is represented by block 210. The image builder 20 starts with the top record and calculates a configuration identification (ConFig ID) of all the entries. In block 212, the image builder 20 groups like orders together. Grouping like orders together allows for increased efficiency due to the commonality between orders.

In block 214, the image builder 20 compares the configuration IDs to the configuration history. If the configuration ID corresponds to a previously configured image, then the image builder 20 looks at whether the image is in a storage device 30, as illustrated in FIG. 1. If the image 218 is found in the storage device 30, then block 220 flags the configuration as ready for delivery and notifies an operator of the computerized network 10 that a desired image is ready. Otherwise, if the image is not found in the storage device 30, the image is created by the image builder 20 according to block 216 as a fresh build. As part of the fresh build process, block 222 requires the image builder 20 to process the bill of materials to determine the parameters for building an image according to the desired software configuration and ensure that they are compatible with the customer's hardware, software and special requirements 224. The final result or output from block 222 is an image or "digital picture" of the desired software configuration according to the bill of materials.

Referring again to FIG. 1, an exemplary embodiment is shown wherein the removable medium includes a baseline image and delta images. The image builder 20 is coupled to the order entry system 15 via interface 17 for receiving the bill of materials which provides pertinent information for creating or building an image of the desired software configuration. Intelligence is provided in this step of the image delivery process because the image builder 20 sorts through a database of stored images to first determine if an image of the desired configuration has already been created for a prior computer configuration. These images are stored on a large capacity storage device 30 or multiple storage devices. If the image of the desired configuration has not previously been created, the image builder 20 selects an appropriate baseline image from the storage device 30 and then determines which incremental images are to be layered on top of the baseline image to achieve the desired final configuration.

These incremental images, which are also referred to as delta images, contain additional information beyond the baseline image for achieving the desired software configuration. A level of granularity is thus achieved because of the linear flow process associated with achieving the desired configuration by adding a delta image to a baseline image. If the delta image is not in the data base, then the image builder constructs the appropriate delta image. Configuration numbers are assigned to all baseline images and delta images, which help the image builder 20 sort through all the possible images that can be used in the configuration process.

The actual steps that must be undertaken to create a digital image of a computing system's hard drive are well known to one skilled in the art. The image builder 20 looks at the data stream to be loaded on the computing system's hard drive 50. Since the disk image delivery process illustrated in FIG. 1 may be a linear process, the image builder 20 goes through the baseline image file by file and identifies those areas that are different and determines what parts are to be replaced. File names are examined not only by their name but by their creation date. The image builder 20 looks at specific files by a specific name or code at the time of its creation.

In lieu of examining the baseline on a file by file basis, a bit by bit comparison may be performed. In addition to the image builder 20 performing this comparison task, another level of intelligence is obtained when the image builder 20 determines changes to be made in registry settings and in interrupt settings so that the new software configuration will operate properly on the computing system. If the desired software configuration is not compatible with the hardware of the computing system, then the image builder rejects the bill of materials as a non-functional configuration.

Either the entire image (baseline and delta) or just the delta image may be loaded onto a computing system (not shown). If the computing system's hard drive, such as the one depicted in FIG. 1, is currently configured and all that is needed is an application upgrade, then only the delta image is created and installed. However, if a new hard drive 50 is being configured, as in a manufacturing and assembly process, then the entire image is installed on the hard drive 50.

The image delivery process avoids having to create a new baseline for every image that is to be delivered. Furthermore, the image builder 20 contains editors that determine, for example, proper registry settings and also add directory information corresponding to installed applications and their file locations. An added benefit of layering information on top of a baseline is that it allows technical support personnel and software engineers to isolate problem areas and debug and correct problems as they arise. Because of the granularity, if a problem arises after a delta configuration was overlaid on top of baseline image, and that image is known to be error free, then it is easy to isolate the problem to the newly added delta configuration. Once another delta image is created with the fix, then the correct image is installed on the computing systems having the known error.

The image builder 20 may include an information handling system, such as a computer having a processor, random-access memory (RAM), read-only memory (ROM), and one or more storage devices, such as a hard disk drive, a floppy disk drive, an optical disk drive, a tape cartridge drive, and the like. The memory, hard drives, floppy disks, and the like are types of computer-readable media. The image builder 20 may be coupled to a monitor 22, a pointing device 24 and a keyboard 26. The image builder is not limited to any particular type of computer. In one embodiment, the image builder 20 is a PC-compatible computer running a version of the Microsoft Windows operating system. The construction and operation of such computers are well known within the art.

The monitor 22 permits the display of information for viewing by a user of the computer. The invention is not limited to any particular monitor 22. Such monitors include cathode ray tube (CRT) displays, as well as flat panel displays such as liquid crystal displays (LCD's). The pointing device 24 permits the control of the screen pointer provided by the graphical user interface of operating systems such as versions of Microsoft Windows. The invention is not limited to any particular pointing device 24. Such pointing devices include mousses, touch pads, trackballs, and point sticks. Finally, the keyboard 26 permits entry of textual information into the image builder 20, as known within the art, and the image builder 20 is not limited to any particular type of keyboard.

The image builder 20 may be coupled to a large volume storage device 30 via interface 28. Once the image builder 20 defines an image and assigns a corresponding configuration number, the images may be stored on the storage device 30. Likewise, when the image builder 20 is creating a disk image, the storage device 30 is first surveyed to find the desired configuration or a close match to the desired configuration for establishing a baseline to build upon. The storage device 30 is not limited to any specific format or structure as long as the storage device 30 comprises a computer-readable media for interfacing. The storage device 30 may be a family of hard disk drives, a floppy disk drive (into which a floppy disk can be inserted), an optical disk drive, or a tape cartridge drive. The implemented storage device 30 may be internal to the image builder 20 or may exist as a stand lone entity, as illustrated in FIG. 1.

After the image builder 20 has created an image of the desired software configuration the image is passed from the storage device 30 to an image server 40 via interface 32. The image server 30 is another computer system similar to the image builder 20. The image server 30 is the point of delivery for the disk image. The image server 30 may have a variety of interfaces as illustrated in FIG. 1. One illustrative embodiment has the image server coupled to a hard drive 50 via interface 60. This embodiment allows the hard drive 50 to be configured with an image of the desired software configuration before installation into a computer system. Another illustrative embodiment has the image server 30 coupled to a disk dupper 52 via interface 61. The disk dupper 52 duplicates the disk image on a computer readable medium, such as a floppy disk, a recordable CD, or a zip drive. Other means of copying the disk image are acceptable.

In still another illustrative embodiment, the image server 40 is coupled. to a ground-based transmitter 54 via interface 62 for wireless transmission of the disk image to an end user. Depending on the transmitter's 54 operating parameters and the transmitter's relay capabilities, the image could be transmitted anywhere in the world. In lieu of the ground based transmitter 54, the image server 40 is connected to the Internet in any particular manner, by which the invention is not limited to and which is not shown in FIG. 1. Internet connectivity is well known within the art.

In one embodiment, the image server 40 includes a modem and corresponding communication drivers to connect to the Internet via what is known in the art as a "dial-up connection." In another embodiment, the image server 40 includes an Ethernet or similar hardware card to connect to a local-area network (LAN) that itself is connected to the Internet via what is known in the art as a "direct connection" (e.g., T1 line, etc.). In further embodiments, the image server 40 may be connected to the Internet using a cable modem or satellite Internet connectivity (as illustrated by transmitter 54).

In yet another illustrative embodiment, the image server 40 is coupled to a management information system (MIS) 56 via interface 63. Management Information Systems may be used to support the infrastructure of businesses and organizations wherein such systems are well known to one skilled in the art.

Additionally, the software, either as an option itself or as the corresponding operational software for the desired devices further complicates the process. For example, although the original drivers may be included on the removable medium, updated drivers and software configurations may be difficult to obtain in a reinstallation process, for instance, such as when required in response to the failure of a disk drive of an information handling system.

By utilizing the present invention, the processing power of the desired information handling system itself may be utilized to configure the software on the information handling system, without requiring the use of network resources. For example, a removable medium, such as a CD-ROM, digital versatile disk (DVD), and the like, may include multiple software configurations. A unique identifier on the information handing system may be used by an executable to load the corresponding information from the CD-ROM without requiring network resources.

Figure 3:
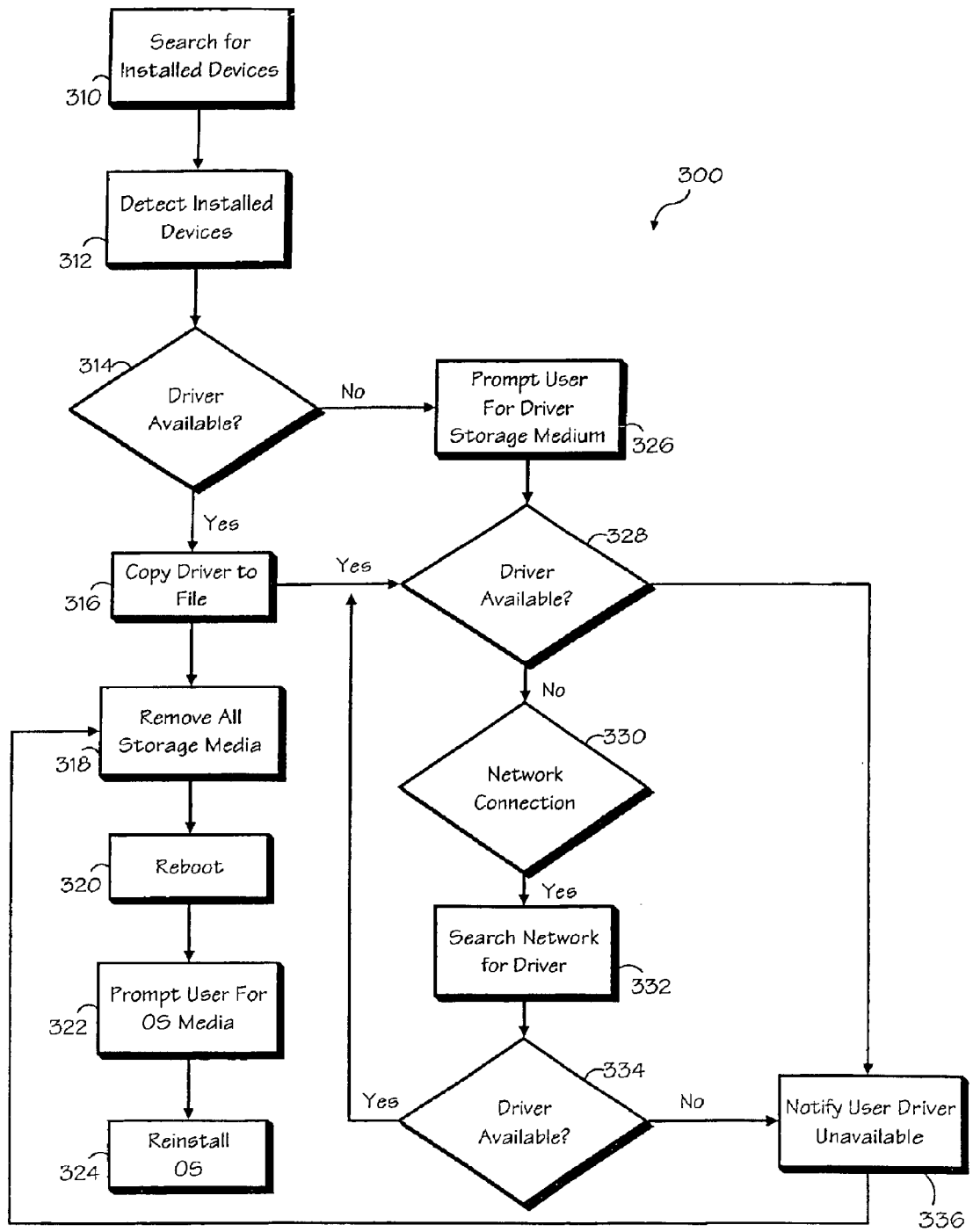
FIG. 3 is a flow diagram of a method for automatically restoring a computer-based information handling system to a previous state in accordance with the present invention.

Referring now to FIG. 3, a flow diagram of a method for automatically restoring a computer-based information handling system to a previous state in accordance with the present invention is shown. The method 300 is preferably implemented by a program of instructions, executable by a computer-based information handling system. The program of instructions may be stored on a computer readable medium tangibly embodied by main memory, auxiliary memory, or input/output device. Preferably, the computer readable medium is a compact disc read-only memory (CD-ROM).

Method 300 is initiated prior to reinstallation of an operating system on computer-based information handling system. Upon initiation of method 300, computer-based information handling system is searched for devices that are presently installed therein at step 310. A device is detected at step 312, and a determination is made whether a device driver for the detected device is available at step 314. The determination of step 314 may include comparing the driver to a table of device drivers known to be available, for example device drivers provided by the to manufacturer at the time of shipment of the computer system from the factory. If a driver for the detected device is unavailable, for example if the device is not a factory installed device but an after purchase add-on, the user is prompted for a storage medium that contains the driver for the add-on device at step 326. If a driver for the detected device is available, the driver is copied to a file at step 316. The file contains drivers for all of the devices installed in the computer-based information handling system such that the drivers are automatically available to the operating system installation program during reinstallation. When drivers for all devices are located and stored in the file, the user is prompted to remove all storage media from all storage media drives at step 318, and the computer system is rebooted at step 320. Upon rebooting of the computer system, the user is prompted to insert the operating system installation program storage medium into the appropriate drive at step 322. The operating system program executes the reinstallation of the operating system onto computer-based information handling system 100 at step 324. The operating system installation program obtains device drivers from the file containing the drivers.

In the situation where the user is prompted for a storage medium containing a device driver for the detected device, a determination is made whether the device driver is available at step 328. If a device driver is available, the driver is copied to the file at step 316. If a device driver is unavailable, for example if the user cannot locate the storage medium on which a device driver for the detected device is stored, a determination is made whether a network is connected to computer-based information handling system at step 330. A network may be connected to computerbased information handling system via input/output system and an appropriate network input/out device. The network is searched for an available driver for the detected device at step 332. If a driver for the detected device is available, the driver is downloaded from the network and copied to the file at step 316. In the event no network is connected to computer-based information handling system as determined at step 330 or no driver for the detected device is available over the network as determined at step 336, the user is notified that a driver for the detected device is unavailable at step 336, and restoration method 300 proceeds at step 318. In this instance, a driver for the device may be available from the operating system installation program, or a device driver for the detected device may be obtained subsequent to the restoration process. Alternatively, the restoration process may be halted until a device driver is available, for example when the user locates the misplaced storage medium containing a driver for the detected device.

Figure 4:
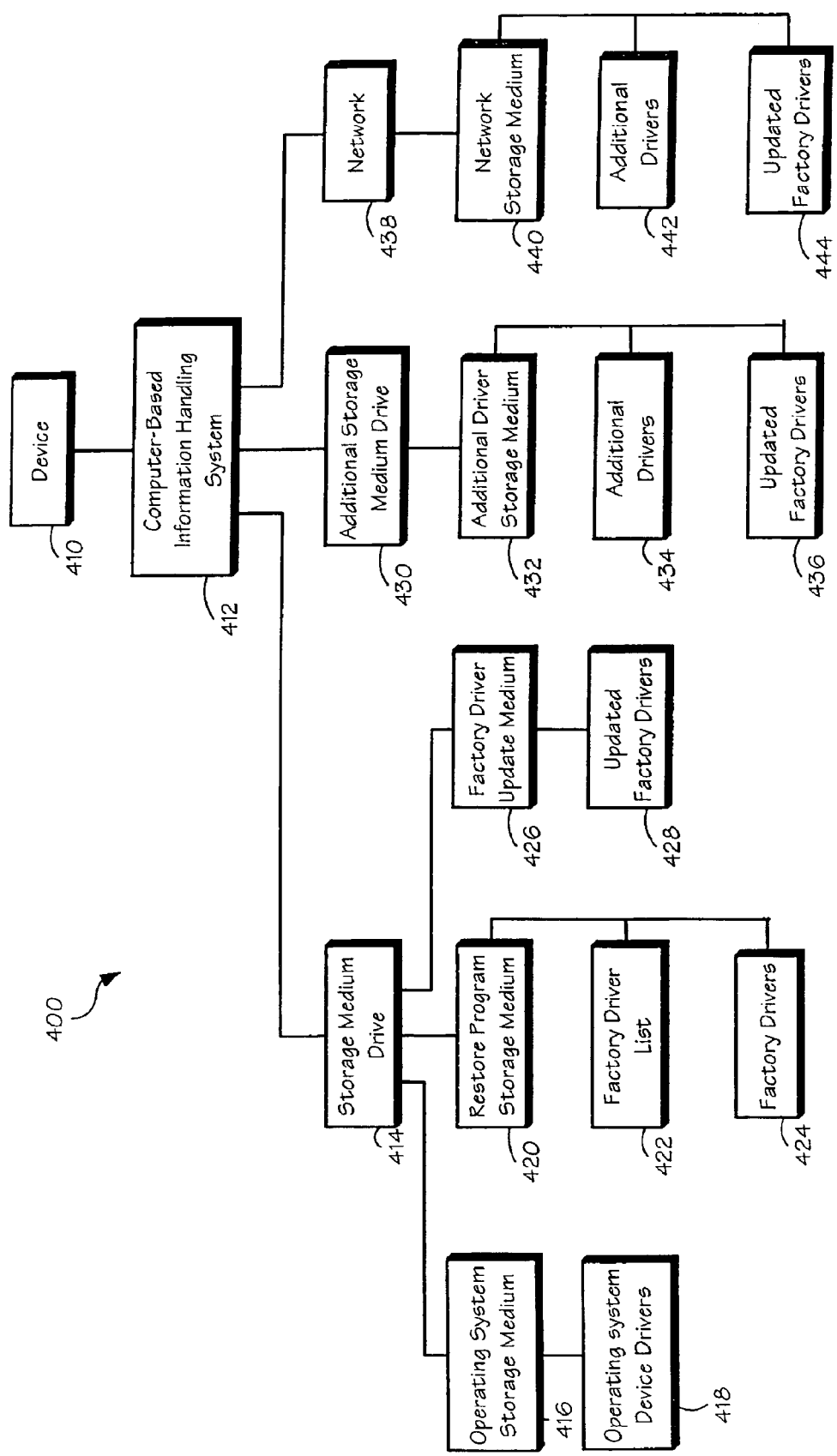
FIG. 4 is a block diagram of a system, tangibly embodying the method depicted in FIG. 3, for automatically restoring a computer-based information handling system to a previous state in accordance with the present invention.

Referring now to FIG. 4, a block diagram of a system, tangibly embodying the method depicted in FIG. 3, for automatically restoring a computer-based information handling system to a previous state in accordance with the present invention is shown. The system 400 includes a device 410 connected to or installed in a computer-based information handling system 412. A storage medium drive 414 is coupled to computer based information handling system 412 for receiving a computer readable medium and for reading information therefrom. The restore storage medium may include, for example, an operating system storage medium 416, a restore storage medium 420, or a factory driver update medium 426. Restore storage medium 420 is inserted into storage medium drive 414 and a restore program thereon is executed in the event the user desires to reinstall the operating system on computer-based information handling system 412. A list of factory installed device drivers 422 may be stored on the restore storage medium 420. Further, restore storage medium 420 may include factory device drivers 424 for all devices installed in computer system 412 as originally manufactured. Operating system program storage medium 416 may include device drivers 418 for common device drivers in existence at the time of publication of the operating system. Factory driver update medium 426 may be provided to the user by the manufacturer to include any updated factory drivers 428 for factory installed devices.

An additional storage medium drive 430 may be coupled to computer system 412 for receiving an additional driver storage medium 432 containing additional drivers 434 for devices that were not factory installed in computer system 412 by the manufacturer. Driver storage medium 432 may be an alternative storage medium to factory driver update medium 426 for providing updated factory drivers 436 to the user. For example, storage medium drive 414 may be a CD-ROM drive and additional storage medium drive 400 may be a floppy drive.

Computer-based information handling system 412 may couple to a network storage medium 440 via network 438. Network storage medium 440 may contain additional drivers 442 for non-factory installed devices added to computer system 412. Additional drivers 442 may be downloaded to computer system 412 via network 438. Alternatively, network storage medium 440 may be disposed at and maintained by the manufacturer of computer system 412 in which case updated drivers 444 for factory installed devices may be downloaded via network 438 rather than via factory driver update medium 426 or additional driver storage medium 432.

Figure 5:
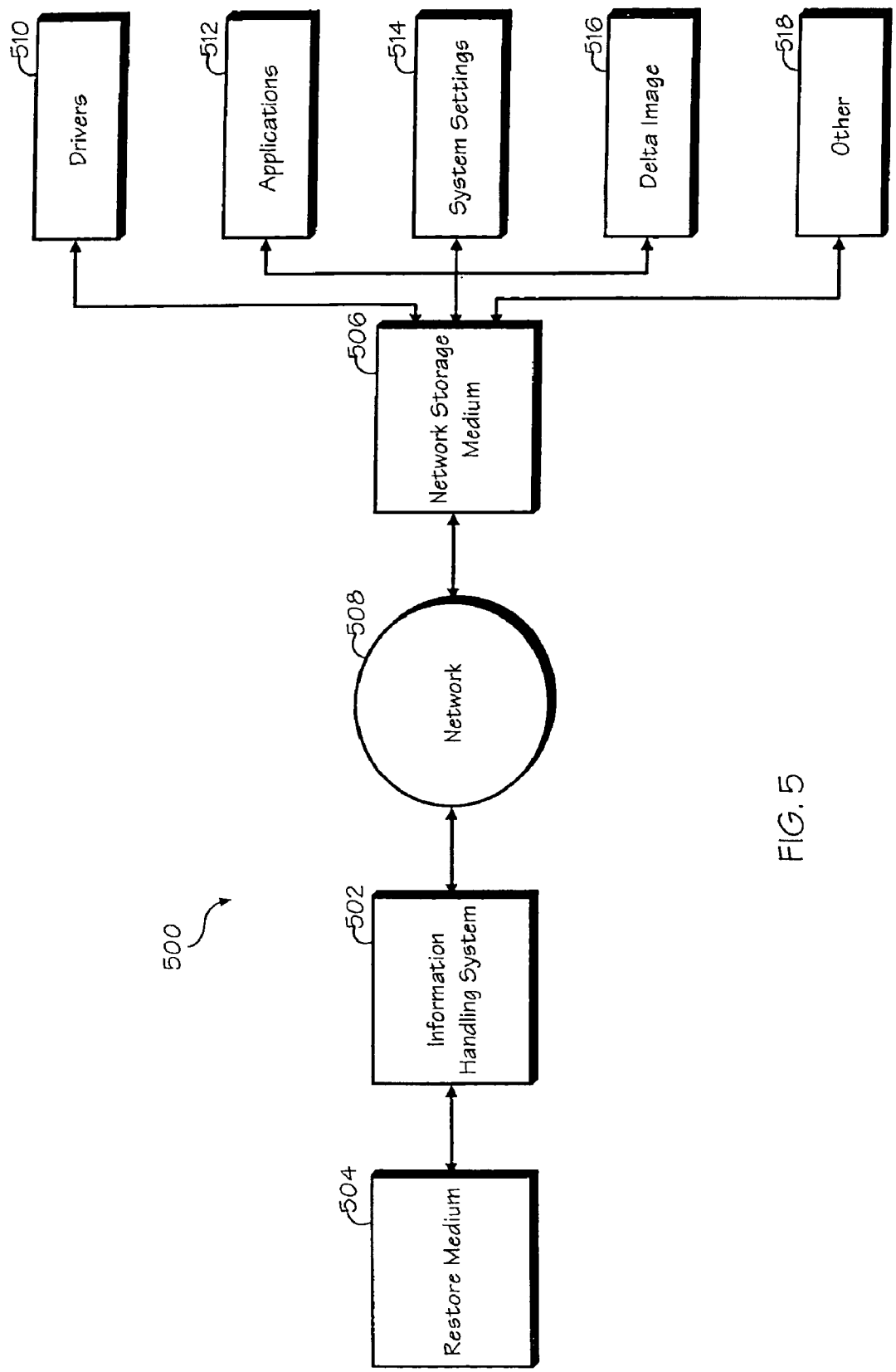
FIG. 5 is a block diagram of an exemplary embodiment of the present invention wherein a network storage medium provides software updates to an information handling system.

For example, as shown in FIG. 5, an exemplary embodiment 500 of the present invention is shown wherein a network storage medium provides software updates to an information handling system. A user suffering a system crash of an information handling system 502, such as the loss of a hard drive, may restore the information handling system 502 by utilizing a restore medium 504 including the necessary software, such as drivers and the like, needed to get the information handling system operational. However, any updated software previously obtained by the user may be lost, such as updated drivers, Internet browsers, email applications, and the like. By utilizing a network storage medium 506, these updated drivers may be identified and provided to the information handling system over a network 508. For example, a user of an information handling system 502 may restore updated drivers 510, applications 512, system settings 514, delta images 516, and other software components 518 as contemplated by a person of ordinary skill in the art.

Figure 6:
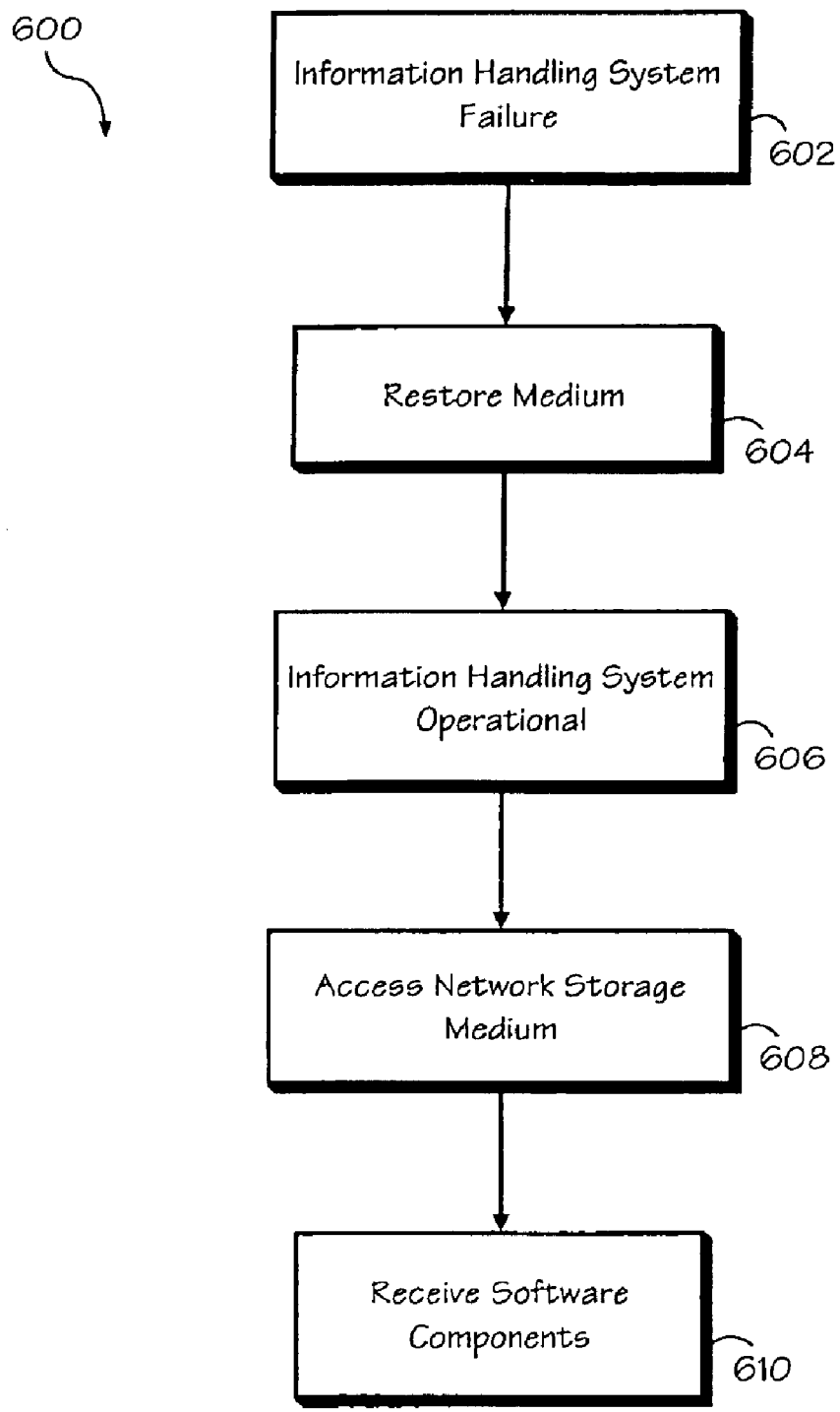
FIG. 6, an exemplary embodiment of the present invention is shown wherein a removable medium is utilized to restore an information handling system to an updated state.

Referring now to FIG. 6, an exemplary embodiment 600 of the present invention is shown wherein a restore medium is utilized to restore an information handling system to an updated state. An information handling system may suffer a catastrophic failure 602, such as an unrepairable error in a hard disk drive, that requires the user to reinstall the system software to get the information handling system operational.

To accomplish this, a user may utilized a restore medium 604 included with the information handling system which contains software components, such as drivers, system settings, and the like, to return the information handling system to an operational status 606. However, these software components may not be the most recent software components desired by the user. For example, a user may install additional hardware requiring new drivers, utilize improved software that became available after the user received the information handling system, and the like. Therefore, once the information handling system is returned to an operational state, the information handling system may access a network storage medium over a network to obtain this updated software 608. This may be done through a program included on the removable medium and placed on the information handling system for execution to receive the software components 610. In this way, the information handling system may be returned to a state more closely resembling the operational state of the information handling system before the catastrophic failure.

Figure 7:
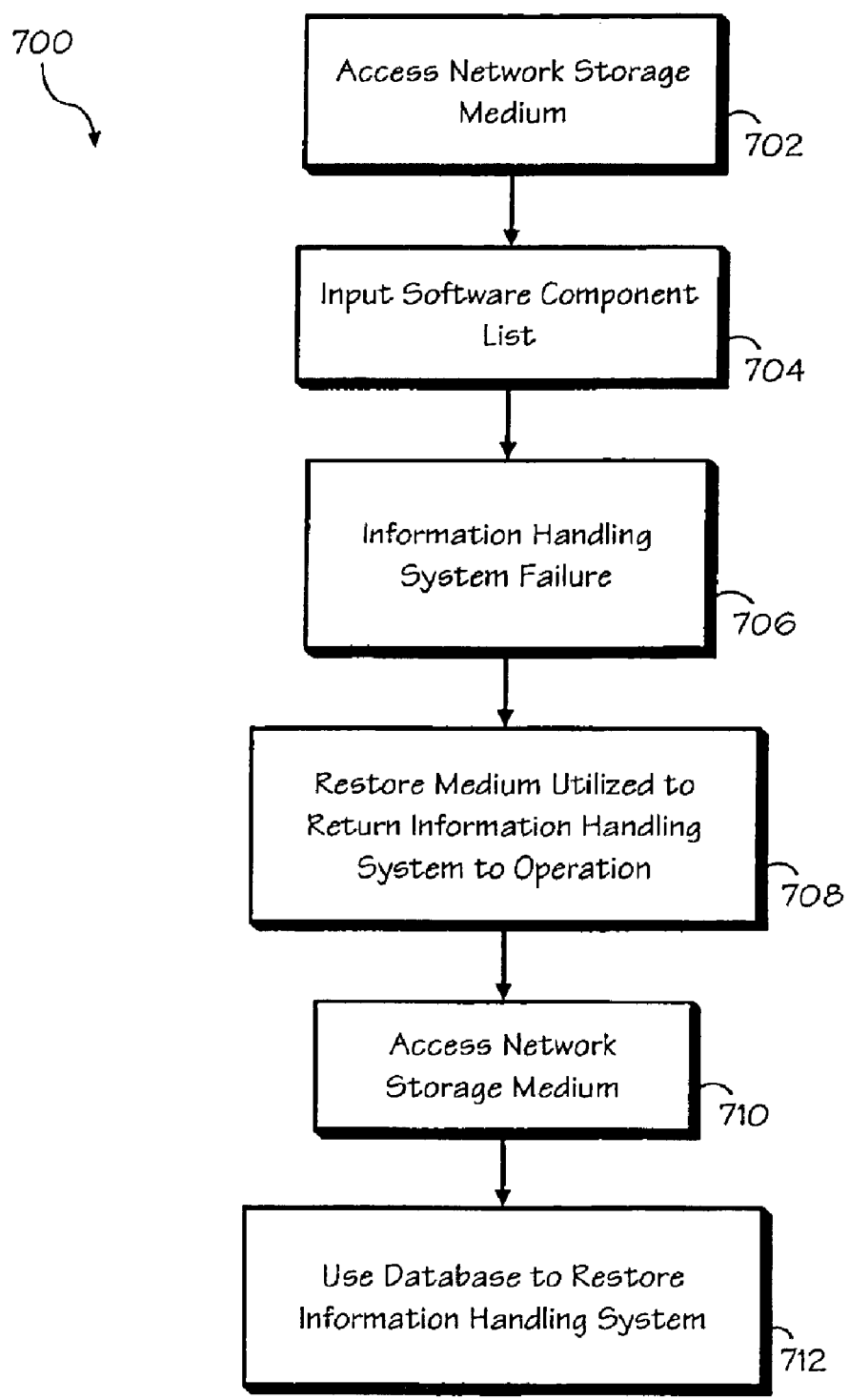
FIG. 7 is a flow diagram of an exemplary embodiment of the present invention wherein a network storage medium utilizes a database to restore updated software to an information handling system.

Referring now to FIG. 7, an exemplary embodiment 700 of the present invention is shown wherein a network storage medium utilizes a database to restore updated software to an information handling system. A user may access a network storage medium 702, such as a website and the like, to leave a list of software components included on the information handling system 704. This may be accomplished by having the network storage medium scan the information handling system and read the various software components, execution of a program contained on the information handling system to supply the information, such as through email, and the like without departing from the spirit and scope of the present invention. Thus, if the information handling system suffers a catastrophic failure 706, such as through the loss of a hard drive, a restore medium included with the information handling system may supply the drivers and other software needed by the information handling system as supplied by the manufacturer. Preferably, the restore medium to may also be utilized to install the necessary software at the factory to lower the need for network resources during the initial manufacturing process. The restore medium may thus load a first set of software components, such as an operating system and drivers, to return the information handling system to operational status 708. Then, the information handling system may execute a program of instructions contained on the medium to access the network storage medium 710. The network storage medium may utilize the database containing the previously inputted data to restore. the information handling system to a state corresponding to the configuration in the database 712. In this way, the information handling system may be restored to a more complete state over previous methods.

It may also be preferable to include a list of software components from the manufacturer of the information handling system so that the information handling system may be restored to its original state. For example, a software component may have compatibility issues with the information handling system, and therefore it may be desirable to know which software components were original to the information handling system and may be restored without complication. Thus, a user may selectively install each non-original software component to test compatibility and therefore determine where the problem lies.

Although the invention has been described with a certain degree of particularity, it should be recognized that elements thereof may be altered by persons skilled in the art without departing from the spirit and scope of the invention. One of the embodiments of the invention can be implemented as sets of instructions resident in the main memory of one or more computer systems. Until required by the computer system, the set of instructions may be stored in another computer readable memory such as auxiliary memory, for example in a hard disk drive or in a removable memory such as an optical disc for utilization in a CD-ROM drive, a floppy disk for utilization in a floppy disk drive, a floppy/optical disk for utilization in a floppy/optical drive, or a personal computer memory card for utilization in a personal computer card slot. Further, the set of instructions can be stored in the memory of another computer and transmitted over a local area network or a wide area network, such as the Internet, when desired by the user. Additionally, the instructions may be transmitted over a network in the form of an applet that is interpreted or compiled after transmission to the computer system rather than prior to transmission. One skilled in the art would appreciate that the physical storage of the sets of instructions or applets physically changes the medium upon which it is stored electrically, magnetically, chemically, physically, optically or holographically so that the medium carries computer readable information.

In exemplary embodiments, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the method and system for providing software utilizing a restore medium and a network of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method of restoring an information handling system utilizing a restore medium to provide software components over a network, comprising:

accessing the restore medium by the information handling system;

loading a first set of software components capable of supplying data suitable for making the information handling system operational;

initiating a connection with a network storage medium over a network, the connection initiated by a program of instructions included on the restore medium; and receiving a second set of software components from the network storage medium over the network connection, wherein the second set of software components is suitable for at least one of updating the first set of software components and providing a software component not included on the restore medium.

2. The method as described in claim 1, wherein the second set of software components include at least one of drivers, applications, system settings, and delta image.

3. The method as described in claim 1, wherein the first set of software components includes at least one of operating system, application, system setting, baseline image, delta image and driver.

4. The method as described in claim 1, further comprising identifying desired software components needed by the information handling system from the network storage medium.

5. The method as described in claim 4, wherein the identified software components are given a unique identifier.

6. The method as described in claim 4, wherein the desired software components are identified during the loading of the first set of software components, and wherein the second set of software components includes software components desired by the information handling system but not included in the first set of software components.

7. The method as described in claim 1, wherein the network storage medium contains a database including a list of software components for installation on the information handling system.

8. The method as described in claim 7, wherein the list of software components is obtained from previous access to the network storage medium by a user.

9. The method as described in claim 7, wherein the list of software components is obtained from a manufacturer of the information handling system.

10. A system for restoring an information handling system and providing software components over a network, comprising:

a restore medium capable of being read by an information handling system, wherein the restore medium includes a first set of software components capable of supplying data suitable for making the information handling system operational and including a program of instructions suitable for initiating a connection with a network storage medium over a network; and a network storage medium accessible over the network by an information handling system, wherein the network storage medium includes a second set of software components suitable for at least one of updating the first set of software components and providing a software component not included on the restore medium.

11. The system as described in claim 10, wherein the second set of software components include at least one of drivers, applications, system settings, and delta image.

12. The system as described in claim 10, wherein the first set of software components includes at least one of operating system, application, system setting, baseline image, delta image and driver.

13. The system as described in claim 10, further comprising identifying desired software components needed by the information handling system from the network storage medium.

14. The system as described in claim 13, wherein the identified software components are given a unique identifier.

15. The system as described in claim 13, wherein the desired software components are identified during the loading of the first set of software components, and wherein the second set of software components includes software components desired by the information handling system but not included in the first set of software components.

16. The system as described in claim 10, wherein the network storage medium contains a database including a list of software components for installation on the information handling system.

17. The system as described in claim 16, wherein the list of software components is obtained from previous access to the network storage medium by a user.

18. The system as described in claim 16, wherein the list of software components is obtained from a manufacturer of the information handling system.

19. A method of restoring an information handling system suffering a loss of function by utilizing a restore medium suitable for providing software components and receiving software components over a network, comprising:

accessing the restore medium by the information handling system;

loading a first set of software components capable of supplying data suitable for restoring the information handling system to operational status;

initiating a connection with a network storage medium over a network, the connection initiated by a program of instructions included on the restore medium and executed by the information handling system; and receiving a second set of software components from the network storage medium over the network connection, wherein the second set of software components is suitable for at least one of updating the information handling system to a restored state.

20. The method as described in claim 19, wherein the second set of software components include at least one of drivers, applications, system settings, and delta image.

21. The method as described in claim 19, wherein the first set of software components includes at least one of operating system, application, system setting, baseline image, delta image and driver.

22. The method as described in claim 19, further comprising identifying desired software components needed by the information handling system from the network storage medium.

23. The method as described in claim 22, wherein the identified software components are given a unique identifier.

24. The method as described in claim 22, wherein the desired software components are identified during the loading of the first set of software components, and wherein the second set of software components includes software components desired by the information handling system but not included in the first set of software components.

25. The method as described in claim 19, wherein the network storage medium contains a database including a list of software components for installation on the information handling system.

26. The method as described in claim 25, wherein the list of software components is obtained from previous access to the network storage medium by a user.

27. The method as described in claim 25, wherein the list of software components is obtained from a manufacturer of the information handling system.

28. A restore medium suitable for restoring operation to an information handling system, comprising:

a computer readable medium suitable for being read by an information handling system, wherein the computer readable medium includes a first set of software components capable of supplying data suitable for making the information handling system operational and including a program of instructions suitable for initiating a connection with a network storage medium over a network; and a program of instructions for initiating a network connection with a network storage device, wherein the network storage medium includes a second set of software components suitable for at least one of updating the first set of software components and providing a software component not included on the restore medium.

29. The restore medium as described in claim 28, wherein the program of instructions configures the information handling system to receive the second set of software components.

30. The restore medium as described in claim 28, wherein the second set of software components include at least one of drivers, applications, system settings, and delta image.

31. The restore medium as described in claim 28, wherein the first set of software components includes at least one of operating system, application, system setting, baseline image, delta image and driver.

32. The restore medium as described in claim 28, further comprising identifying desired software components needed by the information handling system from the network storage medium.

33. The restore medium as described in claim 32, wherein the identified software components are given a unique identifier.

34. The restore medium as described in claim 32, wherein the desired software components are identified during the loading of the first set of software components, and wherein the second set of software components includes software components desired by the information handling system but not included in the first set of software components.

35. The restore medium as described in claim 28, wherein the network storage medium contains a database including a list of software components for installation on the information handling system.

36. The restore medium as described in claim 35, wherein the list of software components is obtained from previous access to the network storage medium by a user.

37. The restore medium as described in claim 35, wherein the list of software components is obtained from a manufacturer of the information handling system.

38. A method of restoring an information handling system suffering a loss of function, comprising:

receiving the restore medium in a drive of the information handling system;

accessing a restore medium received within the drive;

loading a first set of software components from the restore medium, the first set of software components for restoring the information handling system to an operational status;

loading a program of instructions from the restore medium for causing the information appliance to initiate a connection with a network storage medium via a network;

receiving a second set of software components from the network storage medium via the network connection; and loading the second set of software components for returning the information handling system to a restored state wherein the second set of software components is updated in comparison with software components installed on the information appliance prior to the loss of function.

39. The method as described in claim 38, wherein the second set of software components include at least one of an updated driver, an updated application, updated system settings, and an updated delta image.

40. The method as described in claim 38, wherein the first set of software components includes at least one of an operating system, an application, a system setting, a baseline image, a delta image and a driver.

41. The method as described in claim 38, further comprising identifying desired software components needed by the information handling system from the network storage medium and obtaining available updated versions of the software components.

42. The method as described in claim 41, wherein the identified software components are given a unique identifier.

43. The method as described in claim 41, wherein the desired software components are identified during the loading of the first set of software components, and wherein the second set of software components includes software components desired by the information handling system but not included in the first set of software components.

44. The method as described in claim 38, wherein the network storage medium contains a database including a list of software components for installation on the information handling system.

45. The method as described in claim 38, wherein the list of software components is obtained from previous access to the network storage medium by a user.

* * * * *